US006911634B2

(12) United States Patent
Kim et al.

(10) Patent No.: US 6,911,634 B2
(45) Date of Patent: Jun. 28, 2005

(54) WEIGHT DETECTING DEVICE FOR MICROWAVE OVENS

(75) Inventors: Kyoung Ho Kim, Suwon (KR); Jae Man Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/671,629

(22) Filed: Sep. 29, 2003

(65) Prior Publication Data

US 2004/0134902 A1 Jul. 15, 2004

(30) Foreign Application Priority Data

Jan. 10, 2003 (KR) .................................. 10-2003-0001577

(51) Int. Cl.[7] .............................................. H05B 6/68
(52) U.S. Cl. ...................................... 219/708; 219/518
(58) Field of Search ................................ 219/708, 702, 219/703, 704, 714, 506, 518, 720; 117/48, 84; 118/13

(56) References Cited

FOREIGN PATENT DOCUMENTS

| JP | 57155034 A | * | 9/1982 | ............. F24C/7/08 |
| JP | 57155035 A | * | 9/1982 | ............. F24C/7/08 |
| JP | 59044527 A | * | 3/1984 | ............. F24C/7/08 |
| JP | 59215519 A | * | 12/1984 | ............. F24C/1/00 |
| KR | 1996-11448 | | 1/1999 | |

* cited by examiner

*Primary Examiner*—Quang T. Van
(74) *Attorney, Agent, or Firm*—Staas & Halsey LLP (57) ABSTRACT

A weight detecting device for microwave ovens is used to detect a weight of food placed on an exterior casing to minimize a space to install a weight sensor and to prevent heat from being transmitted from an interior casing through a top plate of the interior casing to the weight sensor. The weight detecting device includes a weight detecting unit and a support unit. The weight detecting unit is supported at an end thereof, and detects a weight according to a force applied to a free end thereof. The support unit supports the weight detecting unit at a position spaced apart from a top plate of an interior casing of a microwave oven.

34 Claims, 4 Drawing Sheets

WEIGHT DETECTING DEVICE FOR MICROWAVE OVENS

CROSS-REFERENCE TO RELATED APPLICATION

This application claims the benefit of Korean Application No. 2003-1577, filed Jan. 10, 2003, in the Korean Intellectual Property Office, the disclosure of which is incorporated herein by reference.

BACKGROUND OF THE INVENTION

1. Field of the Invention

The present invention relates, in general, to weight detecting devices for microwave ovens and, more particularly, to a weight detecting device for microwave ovens which is used to detect a weight of food placed on an exterior casing of a microwave oven.

2. Description of the Related Art

Figure 1:
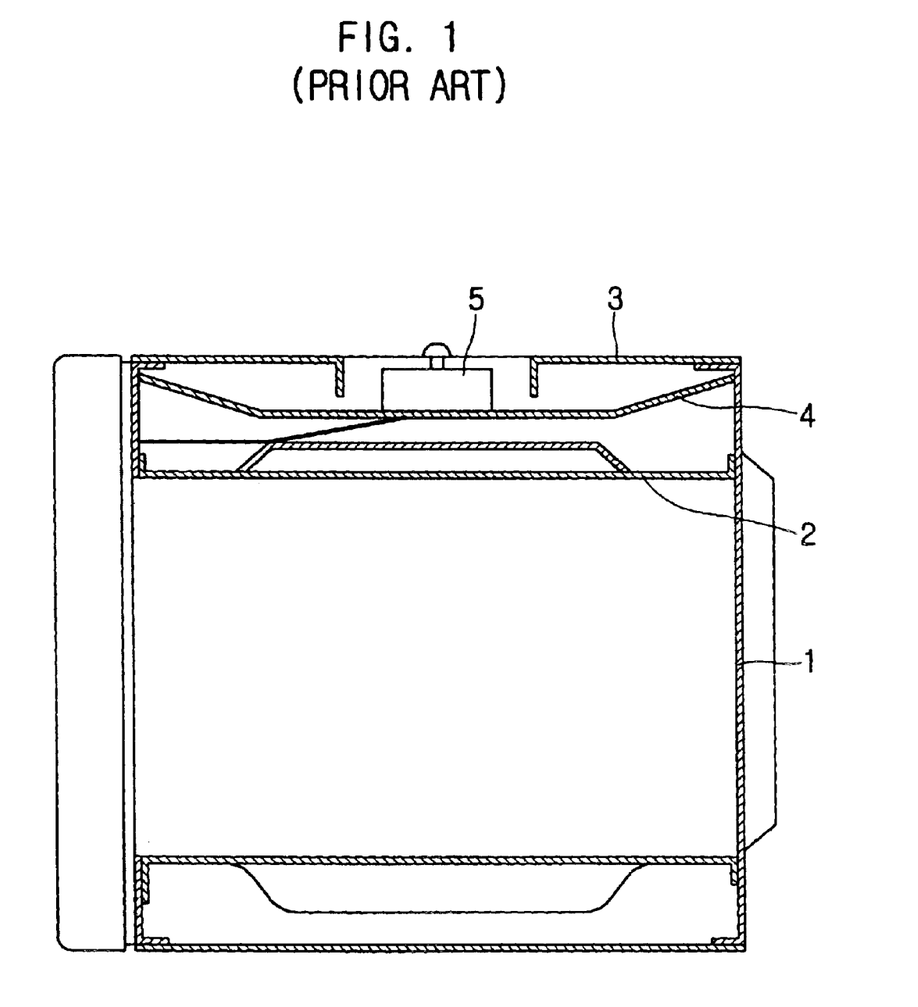
FIG. 1 is a side sectional view of a microwave oven having a conventional weight detecting device.

FIG. 1 is a side sectional view of a microwave oven having a conventional weight detecting device.

As illustrated in FIG. 1, a microwave oven includes an interior casing 1 and an exterior casing 3. A guide plate 4 having a shelf shape is provided in a space defined between a top plate 2 of the interior casing 1 and the exterior casing 3. In the microwave oven of FIG. 1, the guide plate 4 is spaced apart from the top plate 2 of the interior casing 1 by a predetermined height, thus preventing heat from being transmitted from the interior casing 1 through the top plate 2 of the interior casing 1 to the guide plate 4. A weight sensor 5 is provided at a center of the guide plate 4.

In a conventional weight detecting device, the weight sensor 5 has a form of a piezoelectric element which is sensitive to a variation in temperature. Thus, to minimize a heat conduction from the interior casing 1 to the guide plate 4, the guide plate 4 is spaced apart from the top plate 2 of the interior casing 1 by a predetermined height and to surround the weight sensor 5.

However, the conventional weight detecting device has a problem that the guide plate 4 thereof surrounds the weight sensor 5, so a space to install the weight sensor 5 is increased and the size of the guide plate 4 is undesirably increased.

The conventional weight detecting device has another problem that the weight sensor 5 thereof has the form of the piezoelectric element, so a gap between the guide plate 4 and the top plate 2 of the interior casing 1 must be increased so as to minimize the heat conduction from the interior casing 1 to the guide plate 4, thus increasing a space to install the weight sensor 5.

SUMMARY OF THE INVENTION

Accordingly, it is an aspect of the present invention to provide a weight detecting device for microwave ovens, which is designed to minimize a space to install a weight sensor and to minimize heat conduction from an interior casing through a top plate of the interior casing to the weight sensor.

Additional aspects and/or advantages of the invention will be set forth in part in the description which follows and, in part, will be obvious from the description, or may be learned by practice of the invention.

The above and/or other aspects of the present invention are achieved by providing a weight detecting device for microwave ovens, including a weight detecting unit supported at an end thereof and detecting a weight according to a force applied to a free end thereof, and a support unit to support the weight detecting unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENT

Reference will now be made in detail to the present preferred embodiment of the present invention, examples of which are illustrated in the accompanying drawings, wherein like reference numerals refer to like elements throughout.

Figure 2:
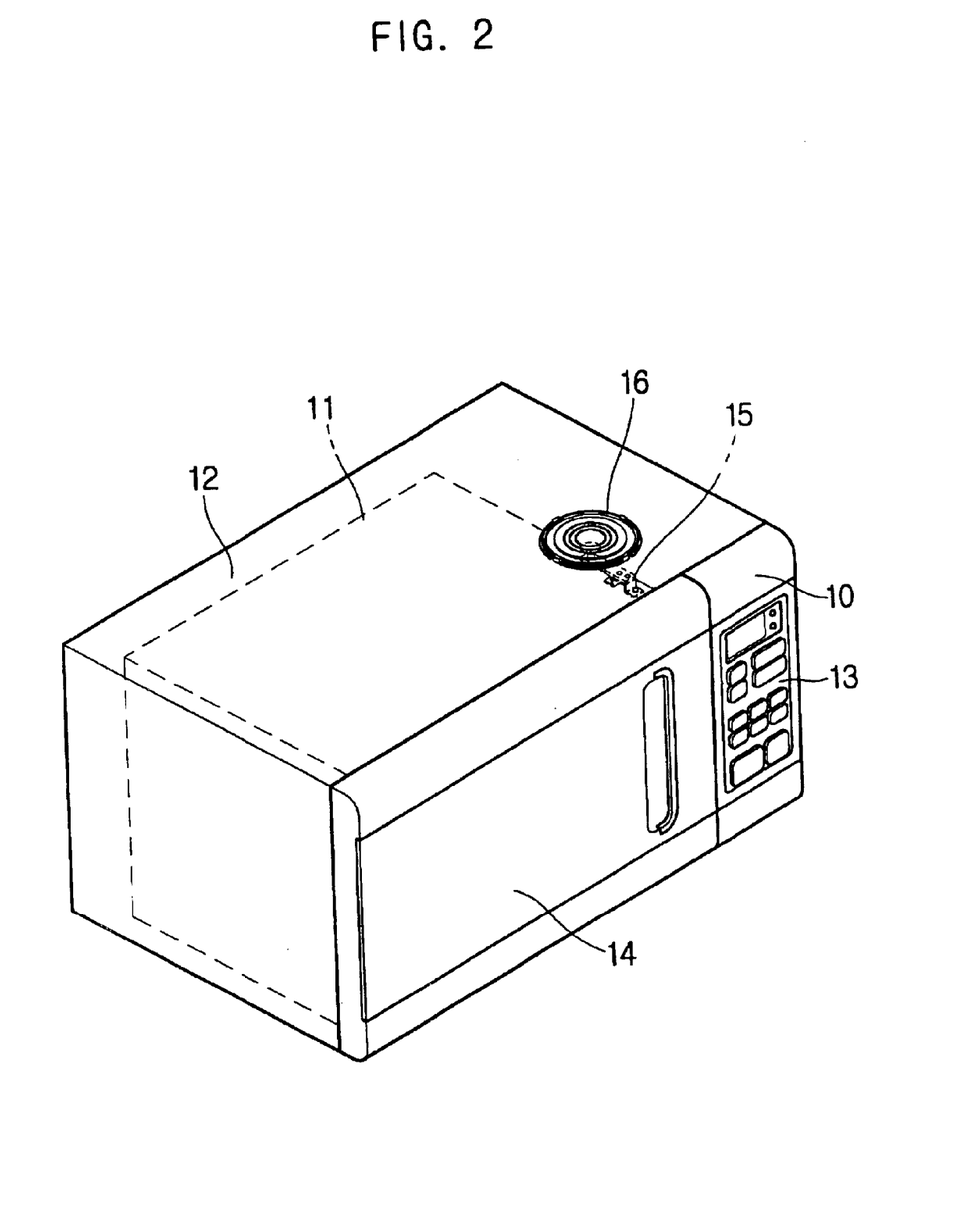
FIG. 2 is a perspective view of a microwave oven having a weight detect device according to an embodiment of the present invention.

FIG. 2 is a perspective view of a microwave oven having a weight detecting device according to an embodiment of the present invention.

As illustrated in FIG. 2, a microwave oven 8 includes a machine room 10 in which a magnetron (not shown) irradiating microwaves is installed. The microwave oven 8 further includes an interior casing 11 partitioned from the machine room 10. The magnetron irradiates microwaves into the interior casing 11. An exterior casing 12 surrounds the interior casing 11 and defines the machine room 10 therein and maintains a predetermined gap between the interior and exterior casings 11 and 12.

A control panel 13 is mounted to a front of the machine room 10 to control an operation of the microwave oven 8. A door 14 is mounted to a front of the interior casing 11 so as to selectively open or close the interior casing 11.

A weight detecting device 15 is provided at a space between a top plate 20 (see FIG. 3) of the interior casing 11 and a top plate 25 (see FIG. 3) of the exterior casing 12. The weight detecting device 15 includes a weight detecting unit 40 and a support unit 41. The weight detecting unit 40 operates to detect a weight of food which is placed on the exterior casing 12. The support unit 41 operates to support the weight detecting unit 40 at a position spaced apart from the top plate 20 of the interior casing 11 by a predetermined height preventing heat from being transmitted from the interior casing 11 to the weight detecting unit 40. The weight detecting unit 40 detects the weight of the food placed on a food seating unit 16 which is provided on the exterior casing 12.

Figure 3:
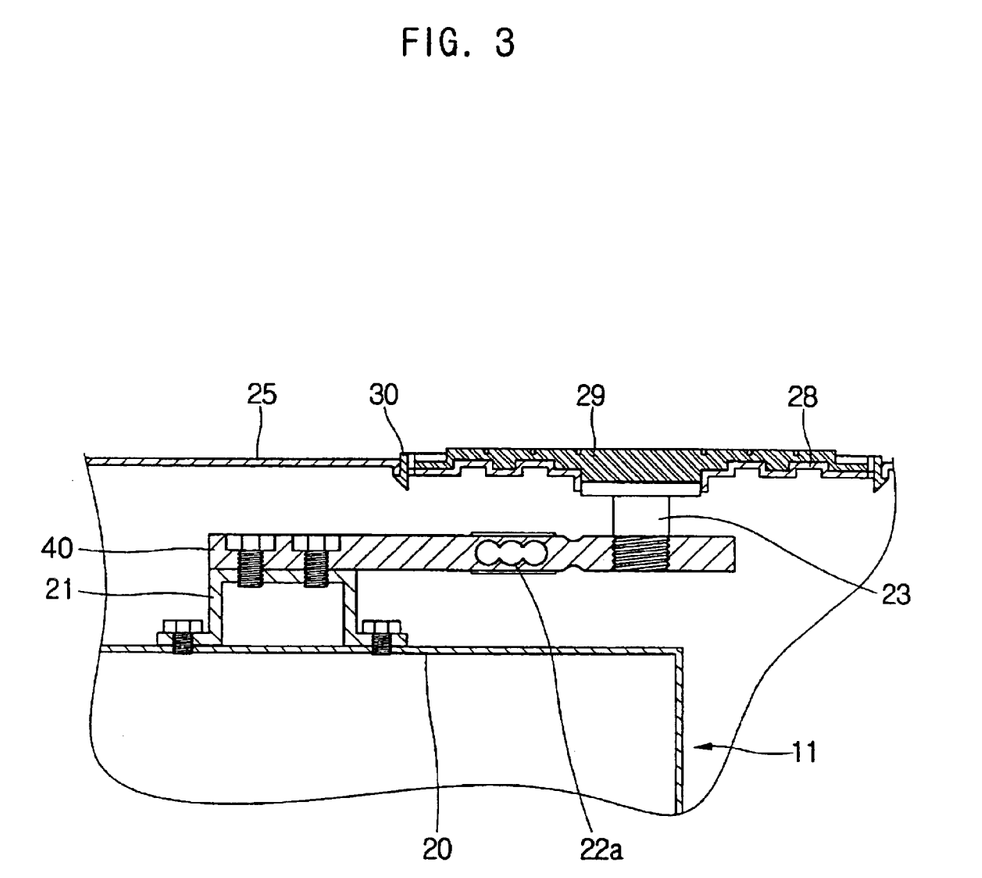
FIG. 3 is a partial sectional view of the microwave oven including weight detecting device illustrated in FIG. 2.
Figure 4:
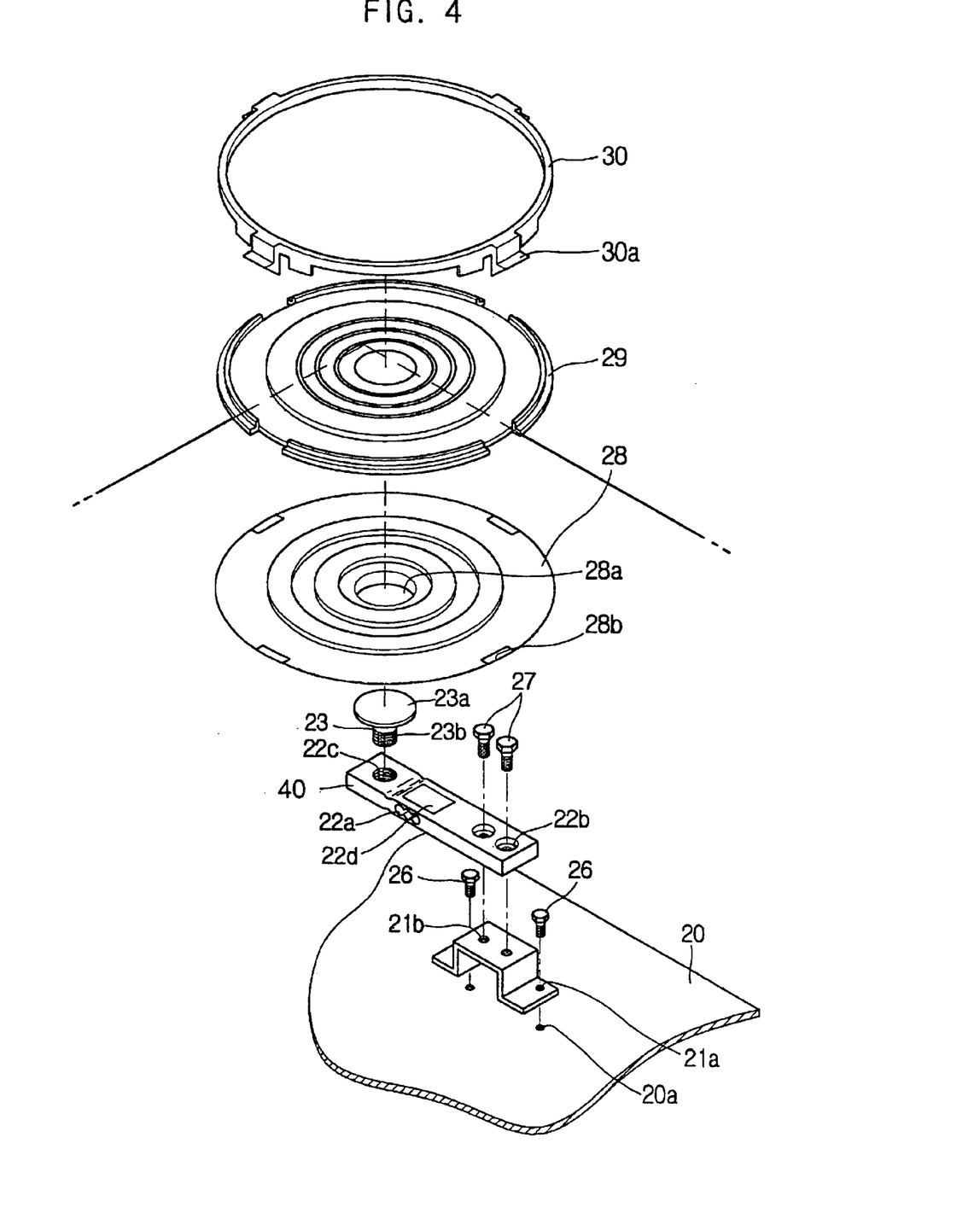
FIG. 4 is an exploded perspective view of the weight detecting device illustrated in FIG. 3.

FIG. 3 is a partial sectional view of the microwave oven 8 including the weight detecting device illustrated in FIG. 2. FIG. 4 is an exploded perspective view of the weight detecting device illustrated in FIG. 3.

As illustrated in FIGS. 3 and 4, the weight detecting unit 40 has a bar shape of a predetermined length, and is supported at an end thereof by a support bracket 21. Further, a shaft 23 acting as a force transmitting unit is mounted to a free end of the weight detecting unit 40 so as to be perpendicular to the free end to transmit a force applied to the food seating unit 16 of the exterior casing 12 to the free end of the weight detecting unit 40.

Screw holes 22b are provided at a fixed end of the weight detecting unit 40 so that the weight detecting unit 40 is screwed to the support bracket 21. A screw hole 22c is provided at the free end of the weight detecting unit 40 to receive the shaft 23. The shaft 23 may be externally threaded, while the screw hole 22c may be internally threaded, so that the shaft 23 is tightened to the screw hole 22c. Further, at least one heat dissipating hole 22a is provided at a predetermined portion of the weight detecting unit 40 to allow the weight detecting unit 40 to be easily bent in response to a load applied to the free end of the weight detecting unit 40 and to dissipate heat. Upper and lower weight sensors 22d are provided on upper and lower surfaces of a central portion of the weight detecting unit 40, respectively. When the weight detecting unit 40 is bent in response to the load applied to the free end of the weight detecting unit 40, the upper surface having the upper weight sensor 22d is expanded while the lower surface having the lower weight sensor 22d contracts, so an internal resistance of the upper and lower weight sensors 22d is varied.

Since the weight detecting unit 40 is made of an elastic material, the weight detecting unit 40 is bent by a force applied to the shaft 23 mounted to the free end of the weight detecting unit 40. A weight of the food is detected based on a variation in the internal resistance of the weight sensors 22d which are varied according to a displacement of the bent weight detecting unit 40.

Further, the support bracket 21 is made of steel, and has two fixing parts 27 so as to be screwed to the top plate 20 of the interior casing 11. A screw hole 21a is formed at a predetermined position of each of the fixing parts 27 so that the support bracket 21 is screwed by screws 26 to the top plate 20 of the interior casing 11. The support bracket 21 has a support part 21c which is upwardly bent from the fixing parts 27, thus allowing the weight detecting unit 40 to be supported at the position spaced apart from the top plate 20 of the interior casing 11 by the predetermined height. The support part 21c is provided with screw holes 21b corresponding to the screw holes 22b which are provided at the fixed end of the weight detecting unit 40.

The shaft 23 is provided with a support plate 23a and a rod 23b. The support plate 23a has a predetermined area to be inserted into the food seating unit 16. The rod 23b concentrates the force applied to the support plate 23a on the free end of the weight detecting unit 40. The rod 23b is tightened to the screw hole 22c of the weight detecting unit 40.

Further, the food seating unit 16 includes a tray bracket 28, a rubber packing 29, and a locking ring 30. The tray bracket 28 is integrated with the top plate 25 of the exterior casing 12. The rubber packing 29 is mounted to the tray bracket 28, thus allowing the food to be seated on the food seating unit 16. The locking ring 30 locks the rubber packing 29 to the tray bracket 28. A shaft receiving hole 28a is provided at a predetermined position of the tray bracket 28 to receive the support plate 23a of the shaft 23 such that the support plate 23a comes into contact with a lower surface of the rubber packing 29. At least one locking slit 28b is formed at at least one position along an outer circumference of the tray bracket 28 to lock the rubber packing 29 to the tray bracket 28. Locking projections 30a provided along an edge of the locking ring 30 are fitted into the locking slits 28b to lock the rubber packing 29 to the tray bracket 28.

The process of assembling the weight detecting device for microwave ovens of FIG. 3 will be described in the following with reference to FIG. 4.

First, the screw holes 21a provided on the fixing parts 27 of the support bracket 21 are aligned with screw holes 20a of the top plate 20 of the interior casing 11. Next, the screws 26 are tightened to the aligned screw holes 20a and 21a to mount the support bracket 21 to the top plate 20 of the interior casing 11.

To mount the weight detecting unit 40 to the support bracket 21 using screws 27, the screw holes 22b of the weight detecting unit 40 are aligned with the screw holes 21b of the support bracket 21. In this case, only an end of the weight detecting unit 40 is supported by the support bracket 21 so as to be spaced apart from the top plate 20 of the interior casing 11 by a predetermined height, thus allowing a size of the support bracket 21 to be reduced. Further, the weight detecting unit 40 has a cantilever beam structure which is effectively resistant to temperature variation, and is supported by the support part 21c of the support bracket 21 to minimize heat conduction from the interior casing 11 through the top plate 20 of the interior casing 11 to the weight detecting unit 40 preventing the weight detecting unit 40 from being affected by a temperature of the interior casing 11.

Further, since the support bracket 21 is mounted to a position of the top plate 20 of the interior casing 11, a space to install the weight detecting unit 40 is considerably reduced. Heat transmitted through the support bracket 21 to the weight detecting unit 40 is dissipated through the heat dissipating holes 22a which are provided at the predetermined portion of the weight detecting unit 40.

After the weight detecting unit 40 is mounted to the support bracket 21, the rod 23b of the shaft 23 is tightened to the screw hole 22c which is formed at the free end of the weight detecting unit 40. An end of the weight detecting unit 40 is supported by the support bracket 21, so the weight detecting unit 40 is bent and a position thereof is varied when the force is applied through the shaft 23 to the free end of the weight detecting unit 40.

After the shaft 23 is mounted to the weight detecting unit 40, the support plate 23a of the shaft 23 is inserted into the shaft receiving hole 28a of the tray bracket 28, which is provided on the top plate 25 of the exterior casing 12, so that the shaft 23 is coupled to the tray bracket 28. The rubber packing 29 is mounted to the tray bracket 28 using the locking ring 30. Thus, when a load, such as food, placed on the rubber packing 29 is transmitted through the shaft 23 to the free end of the weight detecting unit 40, the weight detecting unit 40 is bent and the resistance of the weight sensors 22d of the weight detecting unit 40 is varied, so a weight of the food is detected.

As is apparent from the above description, a weight detecting device for microwave ovens is provided in which a weight sensor of a cantilever beam structure is effectively resistant to temperature variation, to minimize a space to install the weight sensor and to prevent the weight sensor from being affected by a variation in temperature.

Further, the present invention provides a weight detecting device for microwave ovens, which is designed such that only a part of a weight sensor is supported by a support bracket, thus allowing a construction of the support bracket to be simple, therefore minimizing a space to install the weight sensor.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A weight detecting device for a microwave oven, comprising:
   a weight detecting unit supported at an end thereof, and detecting a weight according to a force applied to a free end thereof; and
   a support unit which supports the weight detecting unit at a position spaced apart from a top plate of an interior casing of the microwave oven by a predetermined height, wherein the support unit is mounted to the top plate of the interior casing.

2. The weight detecting device according to claim 1, further comprising a food seating unit, wherein the weight detecting unit detects the weight according to an external force generated by food placed on the food seating unit, the food seating unit being provided on a top plate of an exterior casing of the microwave oven.

3. The weight detecting device according to claim 1, wherein the weight detecting unit further comprises:
   the weight sensor having a predetermined length; and
   a force transmitting unit mounted to the free end of the weight detecting unit so as to transmit the external force to the free end of the weight detecting unit.

4. The weight detecting device according to claim 3, wherein the weight detecting unit is provided with at least one heat dissipating hole.

5. The weight detecting device according to claim 3, wherein the force transmitting unit comprises:
   a support plate having a predetermined area; and
   a rod, provided adjacent to the support plate, to concentrate the force applied to the support plate on the free end of the weight detecting unit.

6. A weight detecting device for a microwave oven, comprising:
   a weight detecting unit supported at an end thereof and detecting a weight according to an external force applied to a free end thereof;
   a support unit to support the weight detecting unit; and
   a food seating unit comprising
      a tray bracket integrated with a top plate of an exterior casing of the microwave oven,
      a rubber packing mounted to the tray bracket, and
      a locking ring to lock the rubber packing to the tray bracket,
   wherein the weight detecting unit detects the weight according to the external force generated by food placed on the food seating unit, the food seating unit being provided on the top plate of the exterior casing of the microwave oven.

7. A weight detecting device with a support unit for a microwave oven, comprising:
   a weight detecting unit formed of a beam fixed at one end thereof to the support unit, supported on an interior casing of the microwave oven at the fixed end of the weight detecting unit by the support unit, to detect a weight placed on a free end of the beam based on a deflection of the beam.

8. A weight detecting device for a microwave oven, comprising:
   a weight detecting unit formed of a cantilever beam, supported on an interior casing of the microwave oven at a fixed end of the weight detecting unit, for which a displacement of a free end thereof is substantially resistant to temperature variation so as to detect a weight placed on the free end of the cantilever beam based on the displacement of the free end thereof.

9. A weight detecting device for a microwave oven, comprising:
   a weight detecting unit formed of a cantilever beam, supported on an interior casing of the microwave oven at a fixed end of the weight detecting unit, for which a displacement of a free end thereof is substantially resistant to temperature variation, and detecting a weight according to a force applied to the free end of the cantilever beam causing the displacement of the free end of the cantilever beam.

10. A weight detecting device with a support unit for a microwave oven, comprising:
    a weight detecting unit supported at an end thereof by the support unit, and detecting a weight according to a force applied to a free end thereof, wherein the support unit supports the weight detecting unit at a position spaced apart from a top plate of an interior casing of the microwave oven by a predetermined height, and the support unit is mounted to the top plate of the interior casing.

11. The weight detecting device according to claim 10, further comprising a food seating unit to transmit to the weight detecting unit an external force generated by the food placed on the food seating unit, the food seating unit being provided on a top of the microwave oven.

12. The weight detecting device according to claim 10, wherein the weight detecting unit comprises:
    a weight sensor having a predetermined length, the weight detecting unit supported at a fixed end thereof by the support unit, and the weight sensor detecting the weight according to an external force applied to a free end of the weight detecting unit; and
    a transmitting unit mounted to the free end of the weight detecting unit so as to transmit the external force to the free end of the weight detecting unit.

13. The weight detecting device according to claim 12, wherein the transmitting unit comprises:
    a shaft positioned perpendicular to the free end of the weight detecting unit to transmit the external force applied to a food seating unit to the free end of the weight detecting unit.

14. The weight detecting device according to claim 12, wherein the transmitting unit comprises:
    a support plate; and
    a rod, positioned between the support plate and the weight detecting unit, to concentrate the external force applied to the support plate onto the free end of the weight detecting unit.

15. A weight detecting device with a support unit for a microwave oven, comprising:
    a weight detecting unit supported at an end thereof by the support unit, and detecting a weight according to a force applied to a free end thereof; and
    a food seating unit comprising
       a tray bracket integrated with the top of the microwave oven,
       a rubber packing mounted to the tray bracket, and
       a locking ring locking the rubber packing to the tray bracket,
    wherein the food seating unit transmits to the weight detecting unit an external force generated by the food placed on the food seating unit, and the food seating unit is provided on a top of the microwave.

16. A weight detecting device with a support unit for a microwave oven, comprising:

a weight detecting unit supported at an end thereof by the support unit, and detecting a weight according to an external force applied to a free end thereof, the weight detecting unit comprising
  a weight sensor of a predetermined length, the weight detecting unit supported at a fixed end thereof by the support unit, and the weight sensor detecting the weight according to the external force applied at a free end of the weight detecting unit,
  a beam supported by the support unit, and
  one or more heat dissipating holes formed in the beam at a predetermined portion of the beam so as to allow the beam to bend in response to the external force applied to the free end of the weight detecting unit and to dissipate heat generated by the microwave oven; and
  a transmitting unit mounted to the free end of the detecting unit so as to transmit the external force to the free end of the weight detecting unit and comprising a shaft positioned perpendicular to the free end of the weight detecting unit to transmit the external force applied to a food seating unit to the free end of the weight detecting unit, wherein the beam of the weight detecting unit communicates with the shaft of the transmitting unit.

17. A weight detecting device with a support unit for a microwave oven, comprising:

a weight detecting unit supported at an end thereof by the support unit, and detecting a weight according to an external force applied to a free end thereof, the weight detecting unit comprising
  a weight sensor of a predetermined length, the weight detecting unit supported at a fixed end thereof by the support unit, and the weight sensor detecting the weight according to the external force applied at a free end of the weight detecting unit and comprising upper and lower weight sensors,
  a beam supported by the support unit wherein the upper and lower weight sensors are provided on each of upper and lower surfaces of a central portion of the beam of the weight detecting unit, respectively, such that a variation, according to a displacement of the beam of the weight detecting unit, in the internal resistance of the upper and lower weight sensors is detected,
  one or more heat dissipating holes formed in the beam at a predetermined portion of the beam so as to allow the beam to bend in response to the external force applied to the free end of the weight detecting unit and to dissipate heat generated by the microwave oven,
  a transmitting unit mounted to the free end of the weight detecting unit so as to transmit the external force to the free end of the weight detecting unit and comprising a shaft positioned perpendicular to the free end of the weight detecting unit to transmit the external force applied to a food seating unit to the free end of the weight sensor, wherein the beam of the weight detecting unit communicates with the shaft of the transmitting unit.

18. A weight detecting device, with a support unit for a microwave oven, comprising:

a weight detecting unit supported at an end thereof by the support unit, and detecting a weight according to an external force applied to a free end thereof, the weight detecting unit comprising
  a weight sensor of a predetermined length, the weight detecting unit supported at a fixed end thereof by the support unit, and the weight sensor detecting the weight according to the external force applied at a free end the weight detecting unit and comprising upper and lower weight sensors
  a beam supported by the support unit, wherein the upper and lower sensors are provided on each of upper and lower surfaces of a central portion of the beam of the weight detecting unit, respectively, such that a variation, according to a displacement of the beam of the weight detecting unit, in the internal resistance of the upper and lower weight sensors is detected,
  one or more heat dissipating holes formed in the beam at a predetermined portion of the beam so as to allow the beam to bend in response to the external force applied to the free end of the weight detecting unit and to dissipate heat generated by the microwave oven; and
a transmitting unit mounted to the free end of the weight detecting unit so as to transmit the external force to the free end of the weight detecting unit and comprising a shaft positioned perpendicular to the free end of the weight detecting unit to transmit the external force applied to a food seating unit to the free end of the weight detecting unit, wherein the beam of the weight detecting unit communicates with the shaft of the transmitting unit,
wherein when the weight detecting unit is bent in response to a load applied to the free end of the weight detecting unit, the upper surface of the beam of the weight detecting unit having the upper weight sensor expands while the lower surface of the beam of the weight detecting unit having the lower weight sensor contracts to change an internal resistance of the upper and lower weight sensors.

19. A weight detecting device with a support unit for a microwave oven, comprising:

a weight detecting unit supported at an end thereof by the support unit, and detecting a weight according to an external force applied to a free end thereof, the weight detecting unit comprising
  a weight sensor of a predetermined length, the weight detecting unit supported at a fixed end thereof by the support unit, and the weight sensor detecting the weight according to the external force applied at a free end the weight detecting unit,
  a beam supported by the support unit, and
  one or more heat dissipating holes formed in the beam at a predetermined portion of the beam so as to allow the beam to bend in response to the external force applied to the free end of the weight detecting unit and to dissipate heat generated by the microwave oven; and
a transmitting unit mounted to the free end of the weight detecting unit so as to transmit the external force to the free end of the weight detecting unit and comprising a shaft positioned perpendicular to the free end of the weight detecting unit to transmit the external force applied to a food seating unit to the free end of the weight detecting unit,
wherein the beam of the weight detecting unit communicates with the shaft of the transmitting unit and the weight detecting unit is made of an elastic material to bend by the external force applied to the shaft.

20. A microwave oven comprising:

an interior casing disposed therein with a top plate thereof;

a support unit; and a weight detecting unit supported on the interior casing at a fixed end of the weight detecting unit by the support unit, and detecting a weight according to a force applied to a free end of the weight detecting unit.

21. The microwave oven according to claim 20, wherein the support unit supports the weight detecting unit at a position spaced apart from the top plate of the interior casing by a predetermined height.

22. The microwave oven according to claim 21, wherein the support unit is mounted to the top plate of the interior casing.

23. The microwave oven according to claim 20, further comprising:

an exterior casing with a top plate thereof; and a weight detecting device comprising a food seating unit to transmit to the weight detecting unit an external force generated by food placed on the food seating unit, the food seating unit being provided on the top plate of the exterior casing.

24. The microwave oven according to claim 23, wherein the food seating unit comprises:

a tray bracket integrated with the top plate of the exterior casing;

a rubber packing mounted to the tray bracket; and a locking ring to lock the rubber packing to the tray bracket.

25. The microwave oven according to claim 20, wherein the weight detecting unit comprises;

a weight sensor having a length, the weight detecting unit supported at a fixed end thereof by the support unit, and the weight sensor detecting the weight according to an external force applied to a free end the weight detecting unit; and a transmitting unit mounted to the free end of the weight detecting unit so as to transmit the external force to the free end of the weight detecting unit.

26. The weight detecting device according to claim 25, wherein the weight detecting unit further comprises:

a beam supported by the support unit and communicating with the shaft of the transmitting unit; and one or more heat dissipating holes formed in the beam at a predetermined portion of the beam so as to allow the beam to bend in response to the external force applied to the free end of the weight detecting unit and to dissipate heat generated by the microwave oven.

27. The microwave oven according to claim 26, wherein, when the weight detecting unit is bent in response to the load applied to the free end of the weight detecting unit, the upper surface of the beam of the weight sensor having the upper weight sensor expands while the lower surface of the beam of the weight detecting unit having the lower weight sensor contracts to change an internal resistance of the upper and lower weight sensors.

28. The microwave oven according to claim 26, wherein the weight detecting unit is made of an elastic material to bend by the external force applied to the shaft.

29. The microwave oven according to claim 25, wherein the transmitting unit comprises:

a support plate; and a rod, positioned between the support plate and the weight detecting unit, to concentrate the external force applied to the support plate onto the free end of the weight detecting unit.

30. The microwave oven according to claim 25, wherein the weight sensor comprises:

upper and lower weight sensors provided on each of upper and lower surfaces of a central portion of the beam of the weight detecting unit, respectively, such that a variation, according to a displacement of the beam of the weight detecting unit, in the internal resistance of the upper and lower weight sensors is detected.

31. A microwave oven, comprising:

an interior casing disposed therein with a top plate thereof;

a support unit; and a weight detecting unit with a beam thereof, supported on the interior casing at a fixed end of the weight detecting unit by the support unit, to detect a weight placed on a free end of the beam based on a deflection of the beam.

32. A microwave oven, comprising:

an interior casing disposed therein with a top plate thereof;

a support unit; and a weight detecting unit with a cantilever beam, supported on the interior casing at a fixed end of the weight detecting unit by the support unit, for which a displacement of a free end thereof is substantially resistant to temperature variation so as to detect a weight placed on the free end of the cantilever beam based on the displacement of the free end thereof.

33. A microwave oven, comprising:

an interior casing disposed therein with a top plate thereof;

a support unit; and a weight detecting unit with a cantilever beam, supported on the interior casing at a fixed end of the weight detecting unit by the support unit, for which a displacement of a free end thereof is substantially resistant to temperature variation, and detecting a weight according to a force applied to the free end of the cantilever beam causing the displacement of the free end of the cantilever beam.

34. A microwave oven, comprising:

an interior casing disposed therein with a top plate thereof;

a support unit mounted on the top plate; and a weight detecting unit only a part of which is supported by the support unit to allow displacement thereof and to reduce a space to install the weight detecting unit.

* * * * *

UNITED STATES PATENT AND TRADEMARK OFFICE
CERTIFICATE OF CORRECTION

PATENT NO.        : 6,911,634 B2
APPLICATION NO. : 10/671629
DATED             : June 28, 2005
INVENTOR(S)       : Kyoung-ho Kim et al.

It is certified that error appears in the above-identified patent and that said Letters Patent is hereby corrected as shown below:

Column 7, line 55, change "oven," to --oven; and--.

Column 8, line 7, change "end" to --end of--.

Signed and Sealed this

Twenty-ninth Day of August, 2006

JON W. DUDAS
*Director of the United States Patent and Trademark Office*